United States Patent
Mereau

(10) Patent No.: US 12,313,042 B2
(45) Date of Patent: May 27, 2025

(54) SYSTEM AND METHOD FOR LIFT ASSISTED MAGNETIC POWER

(71) Applicant: Robert Mereau, Calgary (CA)

(72) Inventor: Robert Mereau, Calgary (CA)

( * ) Notice: Subject to any disclaimer, the term of this patent is extended or adjusted under 35 U.S.C. 154(b) by 0 days.

(21) Appl. No.: 18/612,894

(22) Filed: Mar. 21, 2024

(65) Prior Publication Data
US 2024/0263614 A1 Aug. 8, 2024

Related U.S. Application Data

(63) Continuation of application No. 17/345,675, filed on Jun. 11, 2021, now abandoned.

(51) Int. Cl.
*F03D 9/11* (2016.01)
*F03B 17/06* (2006.01)
*H02J 4/00* (2006.01)

(52) U.S. Cl.
CPC .............. *F03D 9/11* (2016.05); *F03B 17/06* (2013.01); *H02J 4/00* (2013.01); *F05B 2220/706* (2013.01); *H02J 2300/28* (2020.01)

(58) Field of Classification Search
CPC ..... F03D 9/11; F03B 17/06; H02J 4/00; H02J 2300/28; F05B 2220/706
See application file for complete search history.

(56) References Cited

U.S. PATENT DOCUMENTS

| | | |
|---|---|---|
| 7,245,042 B1 * | 7/2007 | Simnacher .............. F03D 15/00 290/43 |
| 7,939,961 B1 | 5/2011 | Bonnet |
| 2013/0175804 A1 | 7/2013 | Cironi |
| 2017/0198401 A1 | 7/2017 | Phillips |

* cited by examiner

*Primary Examiner* — Viet P Nguyen
(74) *Attorney, Agent, or Firm* — Berg Hill Greenleaf Ruscitti LLP

(57) ABSTRACT

A lift assisted magnetic power device is disclosed in which rotational energy is converted into an electrical current. The device, in a preferred embodiment, includes a stand with a rotatable central axis, a plurality of cylinders having a first extremity attached to the central axis and a second extremity extending outwardly. At least one magnet is contained within each one of the cylinders. The magnet(s) are free to move along the cylinder between positions located proximate to both the first extremity and second extremity. A coil surrounds the cylinders to generate an electrical current as the at least one magnet passes through the coil. A connection is provided to carry the electrical current from the coil to a circuit or power source.

4 Claims, 4 Drawing Sheets

SYSTEM AND METHOD FOR LIFT ASSISTED MAGNETIC POWER

CROSS REFERENCE TO RELATED APPLICATION

This application is a Continuation of U.S. application Ser. No. 17/345,675 filed on Jun. 11, 2021, which claims the benefit of and priority to Canadian Patent Application No. 3,083,521, filed Jun. 12, 2020. The entire specification and figures of the above-referenced application are hereby incorporated in its entirety by reference.

FIELD OF THE INVENTION

The present invention is directed to the generation of energy, more specifically, to the generation of electrical energy through the use of lift-assisted displacement of magnets.

BACKGROUND OF THE INVENTION

Conventional energy sources such as fossil fuels (including natural gas, oil, coal) or nuclear are finite (non-renewable) but are still the most widely used energies. However, renewable energy sources like wind, fuel cells, solar, biogas/biomass, tidal, geothermal, have tried to compete against non-renewable energies for many decades making very little headway.

Reasons abound why renewable energies still lag very far behind non-renewable energies despite knowing about the consequences of the consumption of non-renewable energies. The implementation of solar energy devices is limited by the price of the initial device and the limitations on weather and time of day. Solar energy has the greatest disadvantage of all renewable energy sources since it can only produce energy when it is sunny and thus is limited by its sun exposure to at most (on average) 12 hours per day. Wind energy is decried for requiring large turbines and because of the noise such turbines generate. A limitation of wind turbines is the dependency on windy days to operate them. Geothermal energy is desirable insofar as it is not limited like the solar devices or wind turbines. However, the set-up is quite costly as the drilling accounts for over half the costs, such a system for a large scale application requires exploration of deep resources which is risky in and of itself. In the United States, geothermal energy account for substantially less than 1% of all the energy produced in the country. Tidal energy is still difficult to harness and several recent failures of large scale projects have delayed the potential of this energy to become a serious contender to replace fossil fuels.

Despite the potential for application of several renewable technologies on a wider scale, there is substantial pushback given the fact that fossil fuels still represent an advantageous economical short-term solution to supplying energy needs. The drawback of this economic short-sightedness is that the environmental cost is rarely, if ever, calculated and thus, fossil fuel are expected to remain the predominant source of energy supply for a long time unless a new approach to power generation is developed.

The inventor of the present invention disclosed herein applied a number of physical concepts in the pursuit of the generation of clean energy. L.A.M.P.—which stands for Lift Assisted Magnetic Power—is a concept which, when put into practice, results in a device which successfully converts sources of kinetic energy such as non-limiting examples, water and wind into electrical energy. The engineering is fundamentally different than known contemporary wind turbines and hydroelectric systems, both conceptually and physically. One of the aspects of the design is the application of Lenz's Law, which is used to modulate the translation motion of a magnet as it oscillates in a rotating cylindrical capsule.

Despite the various renewable energy sources, there still exists a need for the generation of energy which can overcome some drawbacks of the known methods.

SUMMARY OF THE INVENTION

Accordingly, a novel energy generation device and method employ the movement of magnets through coils to generate electrical current. The magnets are kept in motion through coils by the use of a device which rotates under the exposure of a source capable of generating movement. The movement can be imparted by wind, water, or any under force harnessed to provide rotational movement to the device.

According to a first aspect of the present invention, there is provided a device for the conversion of wind energy into electrical energy.

According to a preferred embodiment of the present invention, the Lift Assisted Magnetic Power (L.A.M.P.) device comprises:
a stand;
a rotatable central axis mounted on said stand;
a plurality of cylinders having a first extremity attached to said central axis and having a second extremity extending outwardly therefrom;
at least one magnet contained within each one of said plurality of cylinders, said magnets being free to move along the cylinder between a first position proximate said first extremity and a second position proximate the second extremity;
a coil surrounding each one of the cylinders and arranged in such a way as to be able to generate an electrical current as the at least one magnet passes through the coil; and
a connection capable of carrying said electrical current from said coil to a circuit (power grid) or powers source (such as a battery).

According to a preferred embodiment of the present invention, the device further comprises sails located at the extremity of each cylinder. Preferably, the sails are adapted to catch wind and allow the conversion of the wind energy into rotational energy of the device. Consequent rotation of the device will, in turn, provide motion of the magnets through the coils and the ultimate generation of electrical current.

BRIEF DESCRIPTION OF THE FIGURES

The invention may be more completely understood in consideration of the following description of various embodiments of the invention in connection with the accompanying figures, in which.

DESCRIPTION OF THE INVENTION

Figure 1:
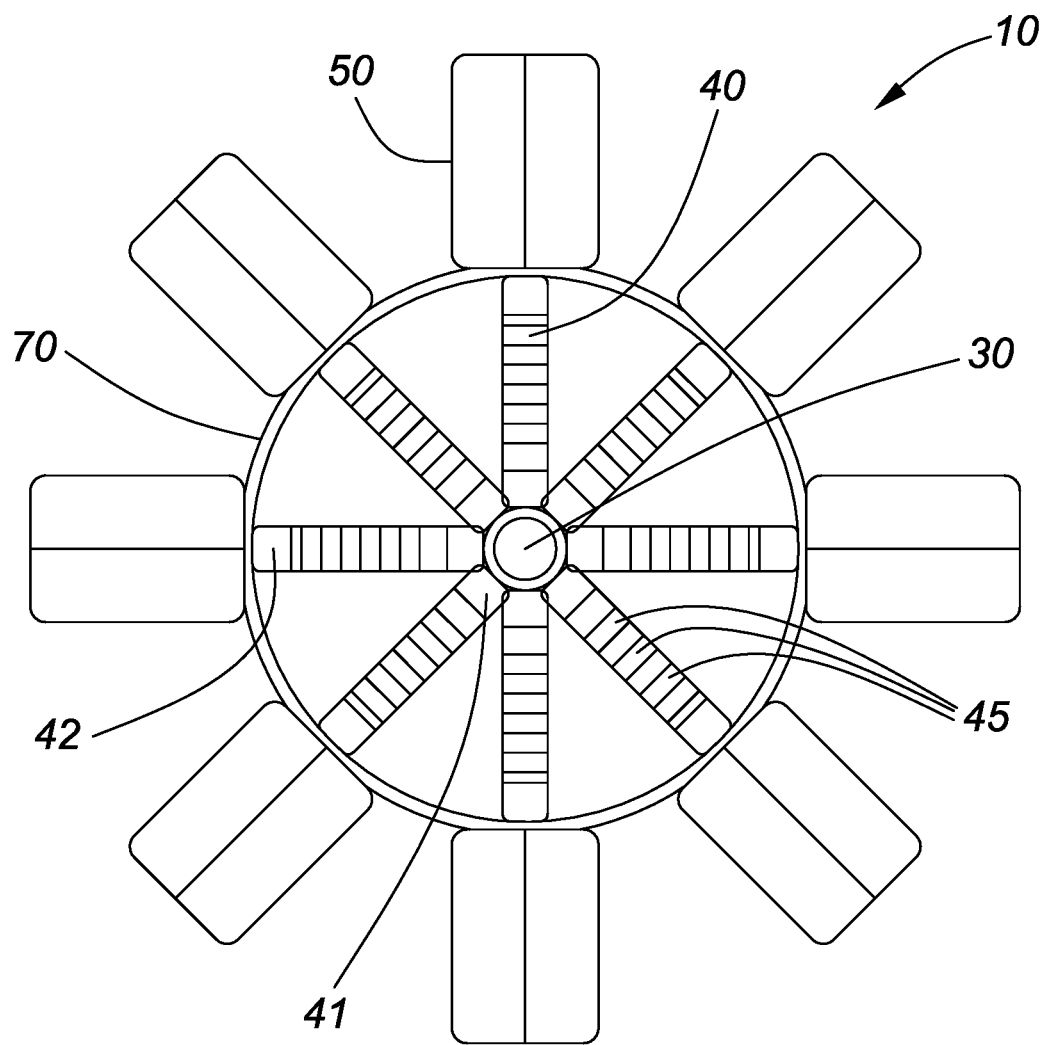
FIG. 1 is a front view of a preferred embodiment of the lift assisted magnetic power device.

According to a preferred embodiment of the present invention, there is provided an electric generation method comprising: the conversion of kinetic energy to gravitational energy to kinetic energy to electric energy. In one embodiment of the present invention, wind turns a device which comprises a plurality of magnets, once the magnet of the device has reached a position where the gravitational forces will push it downwards back to the center of the device (or from the center of the device towards the outer extremity of the cylinder) the magnet will begin to travel down moving through the coils and by doing so, it will generate electricity. In other words, electricity is generated by coupling of the electromotive force of magnets falling through coils with renewable energy-generated vertical lift. Moreover, such a design causes, for every full rotation of the device, each magnet to travel once towards the center of the device and once away from the center of the device and thus, generating electricity on two occasions as it passes through the coils located around each cylinder.

According to a preferred embodiment of the present invention, there is provided a device in which a radial configuration of cylinders rotate around a central axis, in which the force creating rotation is generated by an external kinetic pressure, and the energy is converted to gravitational, kinetic and electromagnetic potential energy by magnets inside the cylinders, of which are able to move assisted or freely along the radial component of the rotational motion, and in doing so, pass through conductive coils and generate electricity. The motion of the magnet may be assisted for stability, for example, a ring magnet falling down with a rail through the axis. In such a case, the magnet does not need energy assistance, but it may need structural assistance for efficiency. According to a preferred embodiment of the present invention, the cylinders may be arranged in a staggered pattern around the central axis in order to allow for a greater number of cylinders to be arranged around the central axis than would normally be possible if they cylinders were not staggered.

According to a preferred embodiment of the present invention, the angular velocity of the device is regulated by an internal braking mechanism located at the support axis and outermost portion of the cylinders, as well as fins/sails/blades which are positioned at the outermost point of the cylinders, thereby maximizing torque. Preferably, the shape and size of the sails can be changed to adapt to the conditions such as the wind and precipitation. Preferably, the sails are rotatably mounted on the cylinders so as to be able to move in one direction or another and thus be capable of capturing the optimal amount of wind necessary to generate the maximum electrical possible. If the device rotates too quickly, then the magnets may not "fall" back down in their respective cylinders because the centrifugal force exerted on the magnet will be greater than the gravity exerted on the magnets, therefore no current is generated in such a situation. The aforementioned braking mechanism and the ability to rotate the sails as well as modify the size of the sails can be used to reach the optimal rotational velocity of the device.

According to a preferred embodiment of the present invention, the velocity of the magnets along the radial component of the rotating device is modulated by metal portions of the cylinders in which Lenz's Law is induced as well non-metal portions where the effect is negligible. Electric diodes are used to direct respective parts of the alternating current(s) generated by the magnet coil interactions.

Wind is the preferred energy input to the rotate the device according to a preferred embodiment of the present invention. According to another preferred embodiment, the device can be rotated by hydro-propulsion via a moving body of water, whereby the motion of the water is due to a gravitational displacement of said body of water. According to another preferred embodiment, the device can be rotated by natural gas pressure differentials created by the liberation of pressurized gas chambers in varying geological reservoirs. According to another preferred embodiment, the device can be rotated by artificial drag forces resulting from the present invention being attached to a vehicle, boat, plane or other similar device. For example, a sail boat modulates external drag force by changing the shape of its sails. One may envision the improvement such a system by the generation of electrical energy while achieving the same drag requirements.

Depending on the application location and other factors such as size or space restrictions or any other factors putting limitations on the size of the device. The size of the present invention may vary, ranging from an apparatus that is portably carried by a person to an industrial size apparatus that is several stories in height. The varying embodiments of the present invention are determine by the ultimate power requirement of the end user as well as environmental factors based on geolocation. For example, a large scale hydrogen plant can be envisioned at sea, where industrial size L.A.M.P.s work together to provide power for electrolysis. One can also envision a rural townhouse where a smaller device is used to heat water.

In addition to the ultimate end power requirements, the design of a L.A.M.P. apparatus may also vary due to environmental constraints. For example, in low wind regions, larger sails are required. In very low wind regions, the sails may be fitted with solar panels such that activation energy can be supplied to sails in order to change shape. An important distinction in the latter case is that the solar energy input is activation or catalyst energy, allowing the sails to change shape and thus allowing L.A.M.P. to begin the capture of wind energy.

Figure 2:
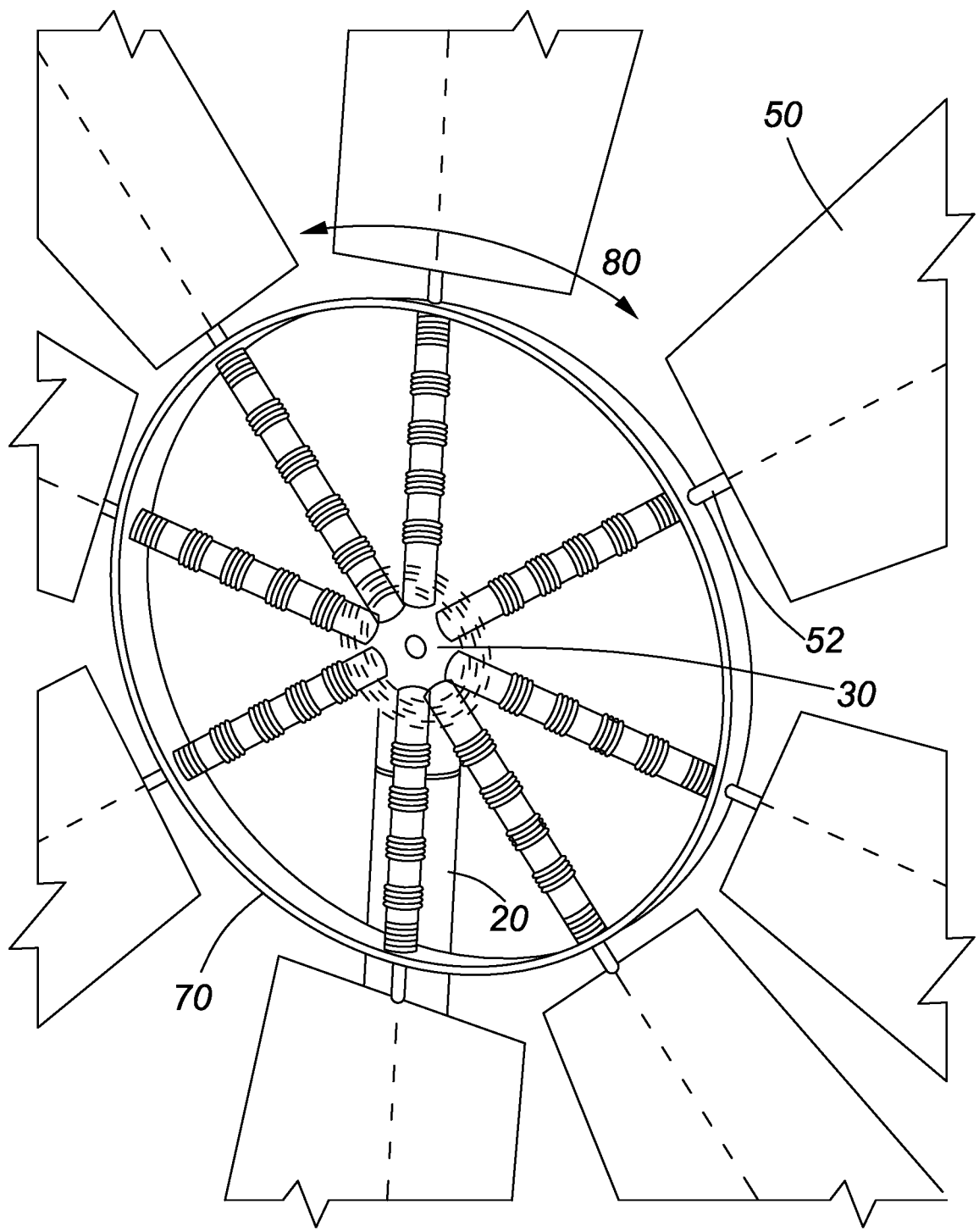
FIG. 2 is a front perspective view of a preferred embodiment of the lift assisted magnetic power device having a stand.
Figure 3:
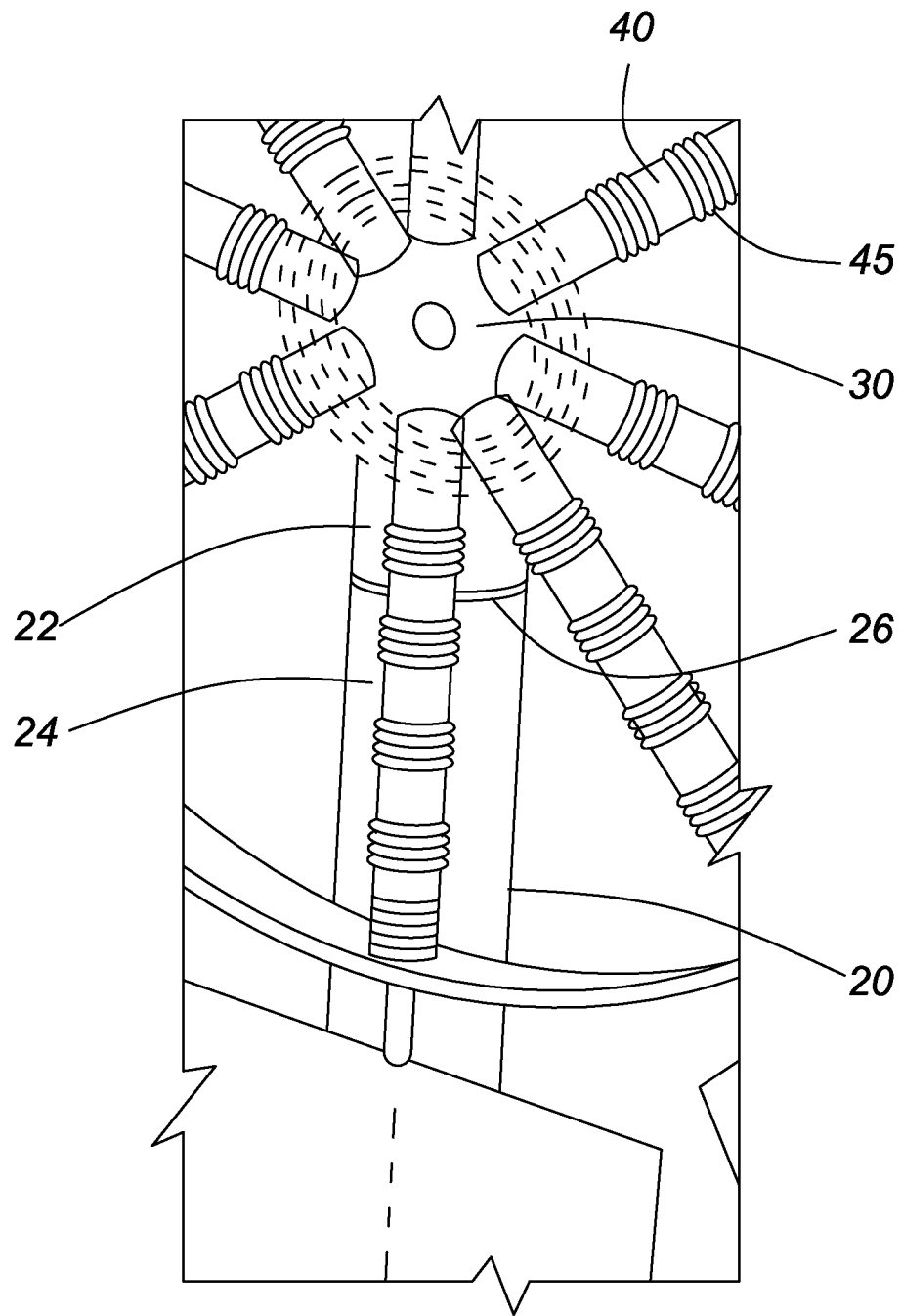
FIG. 3 is a close up of the front perspective view of a preferred embodiment of the lift assisted magnetic power device having a stand.

As seen in FIGS. 1, 2 and 3 and according to a preferred embodiment of the present invention, there is provided a lift assisted magnetic power device (10) comprising:

a stand (20);

a rotatable central axis (30) mounted on said stand;

a plurality of cylinders (40) having a first extremity (41) attached to said central axis and having a second extremity (42) extending outwardly therefrom;

at least one magnet (not visible) contained within each one of said plurality of cylinders (40), said magnets being free to move along the cylinder between a first position proximate said first extremity (41) and a second position (42) proximate the second extremity;

at least one coil (45) surrounding each one of said cylinders (40) and arranged in such a way as to be able to generate an electrical current as the at least one magnet passes through the coil; and a connection (not shown) capable of carrying said electrical current from said coil to a circuit (power grid) or powers source (such as a battery).

According to a preferred embodiment of the present invention, many other devices can be connected to the connection in order to achieve a pre-determined task.

As best shown in FIGS. 2 and 3, the sails (50) are rotatably mounted on the outer extremity of the cylinders (40) through a connection (52) which may allow rotation of the sail (50) so as to be able to move in one direction or another to better capture wind.

The device (10) may be equipped with an outer ring (70) to which the cylinders are physically connected in order to provide some structural strength and prevent torsion of the device.

Arrow (80) indicates that the device (10) may rotate in either direction. Rotation of the device (10) will generate movement of the magnets inside the cylinders (40) and through the coils (45) and thus will generate electrical current. The direction of rotation is inconsequential to the operation of the device and its ability to generate electrical current.

As best shown in FIG. 3, the stand (20) is comprised of two section an upper section (22) on which is mounted the central axis (30) and a lower section (24) which secures the device to the ground. In the preferred embodiment shown in FIG. 3, the two sections are joined together by a point of connection (26) which allows for the rotation of the upper section (22) with respect to the lower section (24) so as to re-position the device (10) to better capture the wind flowing therethrough.

According to a preferred embodiment of the present invention, the cylinders hold the magnet(s) and are attached to and rotate around the central axis. Said cylinders having two extremities where at the first extremity is mounted/attached/connected to the central axis and where a second extremity, opposite said first extremity is either free or is attached to an external wheel. Said external wheel being preferably present in the device as it imparts additional strength and stability to the device. According to a preferred embodiment, the cylinders are attached to a horizontal shaft which itself is rotatably mounted and secured to the stand. According to another preferred embodiment, the cylinders are attached to a horizontal shaft which itself is rotatably mounted and secured to the central axis.

According to a preferred embodiment of the present invention, the cylinders contain the rod for the magnet(s) to slide along. Preferably, the cylinders can be made of various metals or plastic or combinations of both or fiberglass or similar material which can be used a structural member but which is also lightweight to prevent weighing down the device. For a homogenous magnet moving at uniform speed, the type of material it moves through changes the magnitude of the magnetic force opposing its motion.

According to a preferred embodiment of the present invention, each coil wrapped around a single corresponding cylinder is positioned in such a way that their central axis of each coil overlaps.

According to a preferred embodiment of the present invention, the sails are used to adjust the rotating speed and therefore the movement speed of the magnets based on external kinetic pressure used for movement. Preferably, the sails may move open or closed or maintain a certain position. The adjustment to the size and shape of the sails can be controlled by electricity (external source, internal, solar panel integration). The movement may open or close the sails to change the turning speed of the cylinders around the central axis and therefore optimize the electricity generation by the movement of the magnets along the cylinders. One will understand should the wheel turn with such a speed as to prevent the magnets from dropping along the cylinders through the effect of gravity (i.e. centrifugal force exerted on the magnets being greater than the force of gravity exerted on the magnet) it is desirable to reduce the speed of rotation to a speed which will allow the magnets to move up and down inside the cylinders so as to pass repeatedly through the coils and therefore generate a magnetic field which is converted to electrical current as the magnets pass through the coils.

According to a preferred embodiment of the present invention, the sails may vary in the type of material they are made of depending on the geography where they are used and the weather they will be exposed to. Preferably, the sails can be adapted for placement in different location by varying their size; position; number of sails. The shape and geometry of the sails can be adapted to control the speed which will be generated by the device once in place. Preferably, numerous sources of electricity can be used to move the sails, the sources are selected from the group consisting of: lift assisted magnetic power (L.A.M.P.); solar; grid; etc.

According to a preferred embodiment of the present invention, the magnet moves with the cylinder along a rod. According to a preferred embodiment, there is multiple on a cylinder. According to another preferred embodiment, there is single magnet on the cylinder with or without a shell. In use, the magnet will move toward or away from the central axis, depending on the current position of the magnet along the cylinder and the position of the cylinder with respect to the central axis. The position of cylinder with respect to the central axis dictates the direction of the movement (if any) of the magnet. If the cylinder on the which the magnet is located is positioned between a plane along which the central axis is located (and thus parallel to the ground) and the ground (under the central axis), then the magnet will move away from the central axis, due to gravitational forces acting upon it and towards the second extremity of the cylinder (which at that point of the rotation of the device would be located under the plane defined by the central axis) and thus closer to the ground. Upon further rotation of the device, the same magnet will then start moving towards the first extremity of the cylinder (hence towards the central axis) when the cylinder moves above the plane defined by the central axis as the gravitational forces acting upon it will impart movement to the magnet. In both of those instances, when the magnet moves towards the central axis and when the magnet moves away from the central axis, the magnetic field of the magnet moves through the coil to generate electricity. As understood by the person skilled in the art, the strength of the magnetic field, the number of magnets and the size of the magnets all change the electricity generated According to a preferred embodiment of the present invention, the coil is made of wire to conduct electricity, key component for the generation with the magnet. Preferably, the coil generates electricity as the magnetic field move through the middle. Preferably, the material of the coil (and its casing), the length, and the turns all change the electricity generated.

According to a preferred embodiment of the present invention, the coil is attached to the cylinder.

As understood by the person of ordinary skill in the art there may be varying number of coils and turns, all attach on the single cylinder, converge at the central axis and then carry the electricity generated to the source of use.

Depending on the design of the device, the coils can vary in length; number of turns in coil; number of bundles or frequency/spacing; material; the resistivity; the coating on coil; multiple materials Similarly, depending on the design of the device, the magnets can be made of natural material; electromagnets; man-made; or be solar charged. The magnets can vary in size, and dimensions between the types of applications (locations, etc.) to which they are intended. The magnets can also vary in their weights; densities; magnetism. According to a preferred embodiment of the present invention, there is a means to increase the stability of the magnet within the tube. Such means include but are not limited to: a rod in the middle of magnet or the like; ball bearings for sliding or the like.

According to a preferred embodiment of the present invention, there is a second magnet located at either the bottom or top of the tube to provide for a dampening of the magnet movement as it reaches either extremity of the cylinder. Preferably, this is employed to increase the durability of the device and its service life.

According to a preferred embodiment of the present invention, the cylinder can be made of various material, and can also comprise more than one material in one tube. Depending on the design of the device, the length, diameter, thickness of material. Also, the number of tubes on one device may vary depending on various factors including the area it is installed.

According to a preferred embodiment of the present invention, the diodes are attached to the wire on each cylinder. The diode is a component that only allows current to travel in one direction. Preferably, the diode allows for the current to consistently flow towards the central axis in a single direction According to a preferred embodiment of the present invention, the device comprises a braking mechanism. While there are a number of possible braking mechanism, a magnetic braking mechanism is preferred.

According to a preferred embodiment of the present invention, the each cylinder comprises multiple magnets, which can be of various sizes and shapes, and which can be arranged in different configurations in a capsule-like cylindrical structure. Preferably, the capsule-like structure not only holds the magnets together but also assists in their rail-guided movement along the cylinders.

Figure 4:
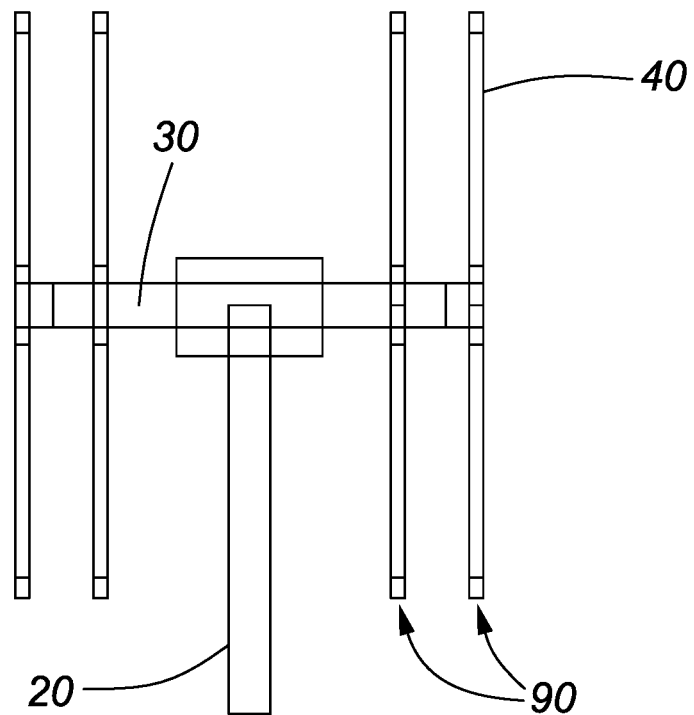
FIG. 4 is a side view of a preferred embodiment of the lift assisted magnetic power device having four wheels mounted on the central axis.

According to a preferred embodiment of the present invention, the device comprises several wheels (90) that are placed parallel to each other, as seen in FIG. 4.

Figure 5:
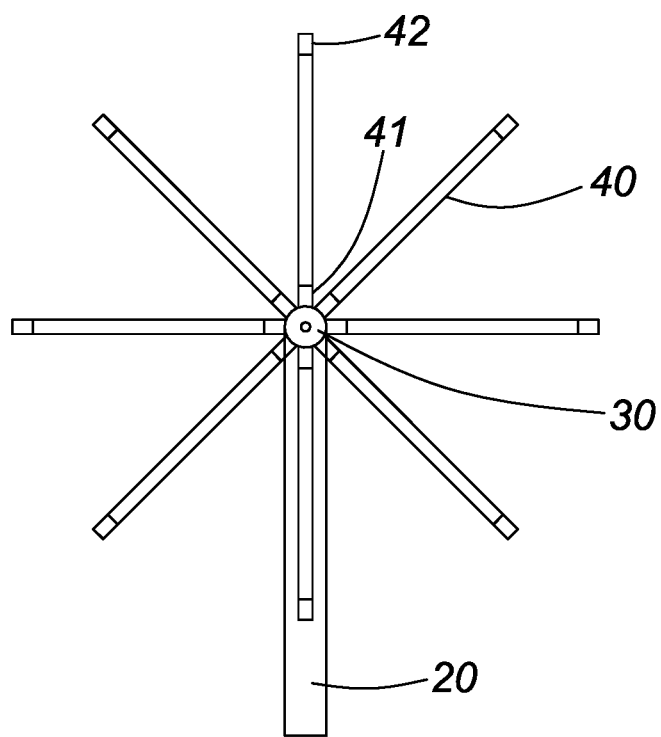
FIG. 5 is a front view of a preferred embodiment of the lift assisted magnetic power device having four wheels mounted on the central axis.

As seen in FIGS. 4 and 5, depending on the design of the device, the stand (20) may adopt widely varying configurations. Different materials can be used to make the stand, so long as they can accomplish the task of being structurally sound with respect to the various parameters of the finalized device and allowing clearance from objects or the ground to allow the device to rotate when a source of energy is applied to the device and more specifically, the sails. These parameters include but are not limited to the height and size of the device; the weight of the device; the need for the ability to pivot (if necessary, depending on the location of the installation). The energy requirement to perform the pivoting operation. As well, factors such as the number of arms (40) on the support frame (i.e. single, tripod, etc.) come into play when designing the device and the stand (20) necessary to keep the wheel above any obstructions on the ground.

Depending on the design of the device, the central axis (slip ring) or also referred to as hub (30) can be made of different type; different size; have different number of wires, etc.

Depending on the design of the device, the diodes can vary in size and capacity. According to a preferred embodiment of the present invention, the diodes can be absent.

According to a preferred embodiment of the present invention, the braking mechanism is selected from the group consisting of: mechanical braking system; magnetic braking system or any other equivalent method which achieves the same purpose. It is to be understood that the braking system is an element used in the optimization of the device of the present invention but is by no means one which should be understood to be a limitation of the basic design.

According to yet another preferred embodiment of the present invention, several devices may be aligned along the same central axis and rotate simultaneously. Preferably, such a device may be designed like an old-fashion water wheels having a plurality of water blades (which the water strikes) bridging the two wheels. Such a device fulfills the goals of rotation all the while providing a sturdy construction design.

According to yet another preferred embodiment of the present invention, the device may be powered by a mechanical rotation of a water wheel (or something similar) which is not mounted on the stand but rather on another separate stand which supports a rotating mechanism. The rotation of this mechanism (either by wind of water movement), in turn, provokes the rotation of a series of links which are connected to and actuate the rotation of the wheels (through a connection with the central hub) and hence the movement of the magnets within the cylinders. This alternative embodiment of the device may be resorted to when the landscape where the device is to be installed does not permit the installation of sails or when the installation of sails may result in their immediate, short term, medium term or long term damage depending on the conditions of the surrounding environment and/or landscape.

According to a preferred embodiment of the present invention illustrated in FIGS. 4 and 5, a lift assisted magnetic power device was made, said device comprises 4 wheels (90) positioned on a single central hub (30) support by a stand (20) which is 10 feet high. Each wheel (90) comprising 8 tubes (40) having a length of 6 feet each. There are 6 coils/tube and 1056 turns/coil. The distance between the coils is of 10 inches. The Lenz brake length is 5 inches. There are 4 circuits on the slip ring, each rated for 600V. There are 113 volts generated per tube, and there are 904 total volts generated at any given time. With an optimal speed of rotation of 16 rpm, and with sail (not shown) dimensions of 1.5 foot×2.5 foot (V-shaped) at a current of 1 amp, there is a total power generation 904 W.

When using several coils, the current generated from each coil as a magnet passes through it may combine into what is referred to as a phenomenon called superposition in waves. It appears when two waves collide or combine, and the resulting waveform can vary. In general if you combine two waves, the values at each point in time add or subtract depending on their values. When two waves combine to create a smaller peak or cancel each other, it is called destructive interference. To eliminate this issue entirely we can add a circuit component called a bridge rectifier. This will provide us a way so no current gets cancelled, and any overlapping current gets added together. A bridge rectifier is a device that takes a sinusoidal current (AKA Alternating Current [AC]), and turns it into only positive flowing current. When two waves combine to create a larger peak, it is called constructive interference. According to a preferred embodiment of the present invention, the use of rectifiers, ensures that there has been no lost current due to destructive interference.

Preferably, the use of one or more bridge rectifiers allows one to take the current produced from a magnet and coil, and harness all of the potential. This allows the device according to a preferred embodiment of the present invention to increase its overall efficiency due to a higher output, and allows us to not waste any of the power produced.

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

The invention claimed is:

1. A lift assisted magnetic power device adapted to convert rotational energy into electrical current, said device comprising:
   a stand;
   a rotatable central axis mounted on said stand;
   a plurality of cylinders having a first extremity attached to said central axis and having a second extremity extending outwardly therefrom;
   a first magnet contained within each one of said plurality of cylinders, the first magnet being free to move along the cylinder between a first position proximate said first extremity and a second position proximate the second extremity;
   a second magnet located at the second extremity of at least one of said plurality of cylinders, wherein the second magnet provides dampening of the movement of the first magnet;
   a coil surrounding each one of the cylinders and arranged to generate an electrical current as the first magnet passes through the coil;
   a connection for carrying said electrical current from said coil to a circuit or power source;
   wherein said plurality of cylinders form a radial configuration of cylinders so that said plurality of cylinders and said first and second magnets rotate around the central axis and not through said central axis;
   an outer ring located proximate the second extremity of said cylinders and secured thereto; and
   a plurality of sails secured to the outer ring and located adjacent said second extremity of each cylinder.

2. The device according to claim 1, wherein the plurality of sails are adapted to capture a kinetic energy generated by a source selected from the group consisting of: wind; water; pressurized or compressed gas.

3. The device according to claim 1 further comprising a bridge rectifier connected to the connection capable of carrying said electrical current prior to sending the electrical current to a circuit or power source.

4. A method to generate electrical current, comprising the steps of:
   providing a lift assisted magnetic power device adapted to convert rotational energy into electrical current, said device comprising:
   a stand;
   a rotatable central axis mounted on said stand;
   a plurality of cylinders having a first extremity attached to said central axis and having a second extremity extending outwardly therefrom;
   a first magnet contained within each one of said plurality of cylinders, said first magnet being free to move along the cylinder between a first position proximate said first extremity and a second position proximate the second extremity;
   a second magnet located at the second extremity of at least one of said plurality of cylinders, wherein the second magnet provides dampening of the movement of the first magnet;
   a coil surrounding each one of the cylinders and arranged to generate an electrical current as the first magnet passes through the coil;
   a connection for carrying said electrical current from said coil to a circuit or power source;
   wherein said plurality of cylinders form a radial configuration of cylinders so that said plurality of cylinders and said first and second magnets rotate around the central axis and not through said central axis;
   an outer ring located proximate the second extremity of said cylinders and secured thereto; and
   a plurality of sails secured to the outer ring and located adjacent said second extremity of each cylinder;
   exposing the device to a source of energy capable of rotating the device and incurring the displacement of the first magnets contained in the cylinders; and
   capturing the electrical current generated by the device by directing the electrical current from the coil to the circuit or power source.

* * * * *